United States Patent
Dressel et al.

(10) Patent No.: US 11,127,511 B2
(45) Date of Patent: Sep. 21, 2021

(54) CABLE AND METHOD FOR MANUFACTURING THE CABLE

(71) Applicant: TE Connectivity Germany GmbH, Bensheim (DE)

(72) Inventors: Andre Martin Dressel, Lampertheim (DE); Florian Brabetz, Gernsheim (DE); Frank Kaehny, Lautertal (DE); Gerzson Toth, Mannheim (DE); Richard Eiberger, Unterschneidheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 16/790,054

(22) Filed: Feb. 13, 2020

(65) Prior Publication Data
US 2020/0265970 A1 Aug. 20, 2020

(30) Foreign Application Priority Data
Feb. 15, 2019 (DE) .......................... 102019202061.5

(51) Int. Cl.
| | |
|---|---|
| *H01R 4/02* | (2006.01) |
| *H01B 7/00* | (2006.01) |
| *H01B 7/08* | (2006.01) |
| *H01B 13/00* | (2006.01) |
| *H01M 50/502* | (2021.01) |

(52) U.S. Cl.
CPC ........... *H01B 7/009* (2013.01); *H01B 7/0807* (2013.01); *H01B 13/0036* (2013.01); *H01M 50/502* (2021.01); *H01R 4/029* (2013.01); *H01M 2220/20* (2013.01)

(58) Field of Classification Search
CPC .. H01B 7/009; H01B 7/0807; H01B 13/0036; H01R 4/029
USPC .................. 174/110 R, 117 R, 117 F, 117 FF
See application file for complete search history.

(56) References Cited

U.S. PATENT DOCUMENTS

| | | | | |
|---|---|---|---|---|
| 3,070,650 A | * | 12/1962 | Stearns ................ | H01R 12/61 174/88 R |
| 3,680,209 A | * | 8/1972 | Hacke ................. | H05K 3/4652 29/831 |
| 4,407,065 A | * | 10/1983 | Gray ...................... | G02B 6/443 156/54 |
| 5,900,587 A | * | 5/1999 | Piper ..................... | H01R 12/62 174/117 F |

(Continued)

FOREIGN PATENT DOCUMENTS

| | | |
|---|---|---|
| CN | 201525897 U | 7/2010 |
| DE | 10224713 A1 | 12/2003 |

(Continued)

OTHER PUBLICATIONS

European Search Report, dated Jul. 2, 2020, 9 pages.

(Continued)

*Primary Examiner* — William H. Mayo, III
(74) *Attorney, Agent, or Firm* — Barley Snyder

(57) ABSTRACT

A cable includes a cable core formed of an electrically conductive material and an insulation at least partially encasing the cable core. The cable core is exposed in a contact zone in which the cable contacts an electrical conductor. A surface of the contact zone is filled substantially flush with a cable surface of the insulation.

15 Claims, 2 Drawing Sheets

(56) References Cited

U.S. PATENT DOCUMENTS

| | | | | |
|---|---|---|---|---|
| 6,020,559 | A | * | 2/2000 | Maeda ................. H01B 7/0838 174/117 F |
| 6,333,467 | B1 | * | 12/2001 | Matsuo ................. H01R 12/592 174/250 |
| 6,995,318 | B2 | | 2/2006 | Kirschenbaum |
| 7,223,919 | B2 | * | 5/2007 | Gagne ................. H01B 7/0869 174/117 F |
| 8,779,292 | B2 | * | 7/2014 | Wang ..................... H01R 12/62 174/88 R |
| 9,877,391 | B2 | * | 1/2018 | Hirashima ............. H05K 1/111 |
| 2004/0055784 | A1 | * | 3/2004 | Joshi .................... B23K 1/0008 174/254 |
| 2005/0057262 | A1 | * | 3/2005 | Kirschenbaum ....... G01R 31/68 324/538 |
| 2007/0033800 | A1 | | 2/2007 | Bierbaum |
| 2008/0073104 | A1 | * | 3/2008 | Barberree ............ H01R 9/0524 174/93 |
| 2014/0246068 | A1 | | 9/2014 | Krokoszinski et al. |
| 2015/0076690 | A1 | | 3/2015 | Yoshino |
| 2016/0149195 | A1 | | 5/2016 | Yamauchi et al. |

FOREIGN PATENT DOCUMENTS

| | | |
|---|---|---|
| DE | 102013203638 A1 | 9/2014 |
| DE | 112014003173 T5 | 3/2016 |
| EP | 1256408 A1 | 11/2002 |
| EP | 3327761 A1 | 5/2018 |
| KR | 1020100110937 A | 10/2010 |
| WO | 03073811 A1 | 9/2003 |
| WO | WO 03/073811 A1 * 9/2003 ............... H05K 3/36 |  |

OTHER PUBLICATIONS

Translation of KR 2010 0110937A, dated Oct. 14, 2010, 11 pages.
Translation of CN201525897U, dated Jul. 14, 2010, 4 pages.
German Office Action, Application No. 102019202061.5, dated Nov. 22, 2019, 11 pages.
Abstract of DE10224713, dated Dec. 18, 2003, 1 page.

* cited by examiner

CABLE AND METHOD FOR MANUFACTURING THE CABLE

CROSS-REFERENCE TO RELATED APPLICATION

This application claims the benefit of the filing date under 35 U.S.C. § 119(a)-(d) of German Patent Application No. 102019202061.5, filed on Feb. 15, 2019.

FIELD OF THE INVENTION

The present invention relates to a cable and, more particularly, to a cable having a contact zone in which a cable core is exposed to contact an electrical conductor.

BACKGROUND

A cable having an electrically conductive cable core and an insulation at least partially encasing the cable core commonly has a contact zone in which the cable core is exposed. The cable contacts an electrical conductor in the contact zone. Such cables are connected, in particular through ultrasound welding, to cell connectors of battery cells in a motor vehicle, for example, for the purpose of measuring difference in potential.

In the case of ultrasound welding, a sonotrode is placed onto the contact zone. By introducing high-frequency mechanical vibrations, the sonotrode produces resonation which can be transferred to the contact zone. By virtue of the high frequency and the pressure, friction gives rise to an atomic connection between the contact zone and the electrical conductor. For this purpose, a minimum size of contact zone is required for placing the sonotrode thereon. Miniaturisation of the cable is thus impaired by the size of the contact zone.

SUMMARY

A cable includes a cable core formed of an electrically conductive material and an insulation at least partially encasing the cable core. The cable core is exposed in a contact zone in which the cable contacts an electrical conductor. A surface of the contact zone is filled substantially flush with a cable surface of the insulation.

BRIEF DESCRIPTION OF THE DRAWINGS

The invention will now be described by way of example with reference to the accompanying Figures, of which.

DETAILED DESCRIPTION OF THE EMBODIMENT(S)

Hereinafter, the invention is described in greater detail by way of example using exemplary embodiments with reference to the attached figures. In the figures, elements which correspond to one another in design and/or function are provided with the same reference symbols. The combination of features shown and described with the individual exemplary embodiments serves solely the purposes of explanation. In accordance with the statements above, it is possible to dispense with a feature from an exemplary embodiment if this technical effect is of no importance in a particular application. Conversely, according to the above statements, a further feature can be added in an exemplary embodiment if this technical feature is advantageous or necessary to a particular application.

Figure 1:
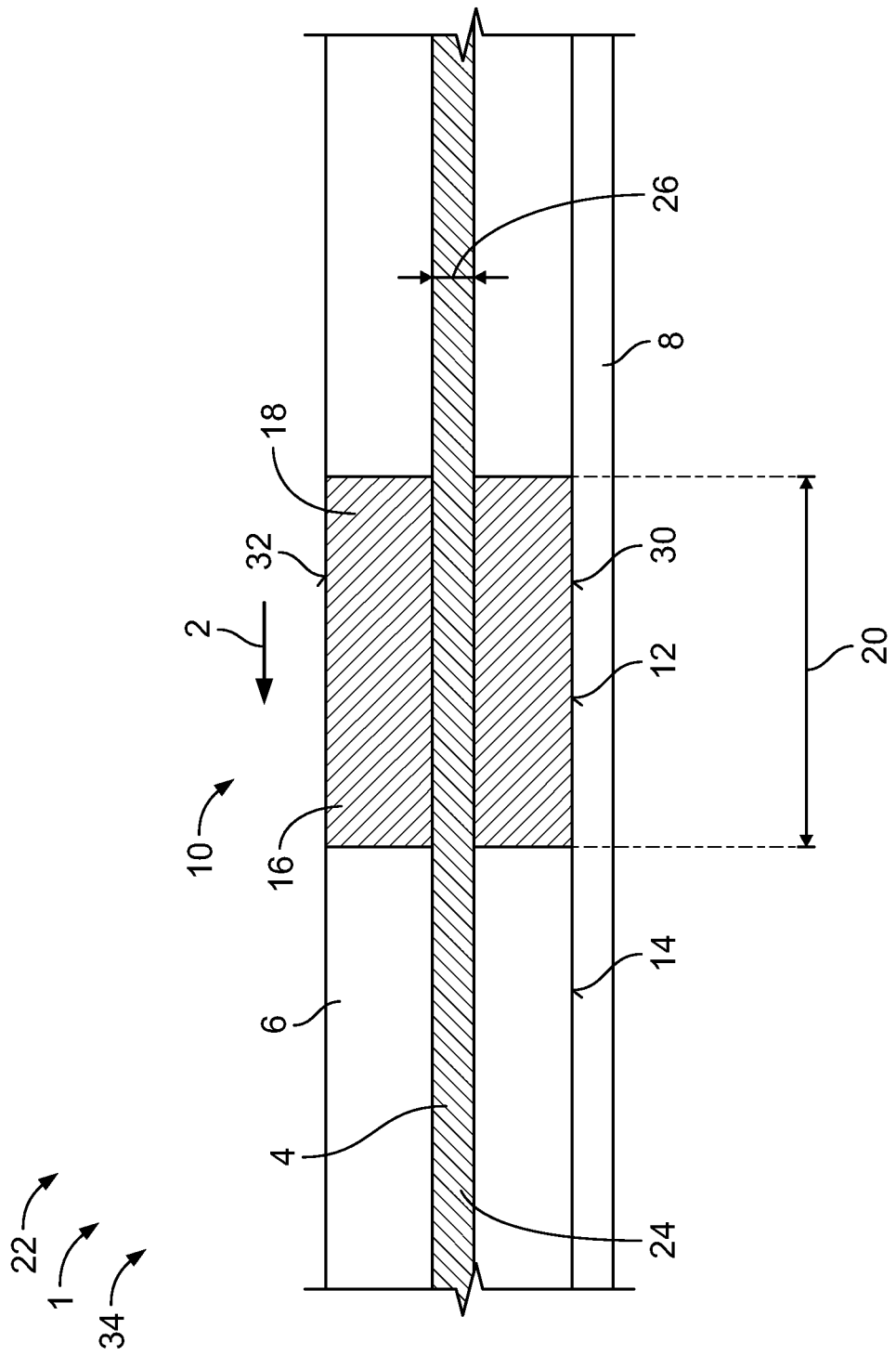
FIG. 1 is a sectional side view of a cable according to an embodiment.

A cable 1 according to an embodiment is shown in a sectional view in FIG. 1 along a cable direction 2. The cable 1 extends along the cable direction 2 and has a cable core 4, which is encased at least partially by an insulation 6. In order to contact an electrical conductor 8, which is schematically depicted in FIG. 1, the cable core 4 is exposed in a contact zone 10.

As shown in FIG. 1, the contact zone 10 is filled so that a surface 12 of the contact zone 10 is arranged substantially flush with a surface 14 of the cable 1, in particular the insulation 6. As a result, the surface 12 of the contact zone 10 can be pushed against the electrical conductor 8 without great difficulty and without deforming the cable core 4. It is consequently possible, at the contact zone 10, to keep the distance between the contact zone 10 and the electrical conductor 8 small and to connect the cable 1 to the electrical conductor 8 with laser welding methods.

In the contact zone 10, an electrically conductive contact material 16 can be applied galvanically onto the cable core 4, as shown in FIG. 1, so that not only a mechanical connection between the cable 1 and the electrical conductor 8, but also an electrically conductive connection, is produced in the contact zone 10. The electrically conductive contact material 16 can be applied galvanically, for example, by a reverse pulse plating or by via plating. In an embodiment, the cable core 4 is formed from substantially a same material as the contact material 16, so that no electrical multiphase system or contact corrosion arises between a filling 18 of the contact zone 10 and the cable core 4. "Substantially" here means that the cable core 4 and the electrically conductive contact material 16 have a same main component; thus the cable core 4 for example can be formed from a copper alloy and the electrically conductive contact material 16 can be a different copper alloy.

By way of the contact zone 10 which is filled substantially flush with the surface 14, the contact zone 10 can be held down without great difficulty, for example for laser welding. As a result, it is possible to keep a width 20 of the contact zone 10 small. In the case of the known ultrasonic welding, the cable core 4 is pushed against the electrical conductor 8 with a sonotrode, and therefore the width of the contact zone 10 must be sufficiently large to allow the sonotrode to be placed on the cable core. The contact zone 10 can for example have a width 20 of a maximum of approximately 0.8 mm.

Figure 2:
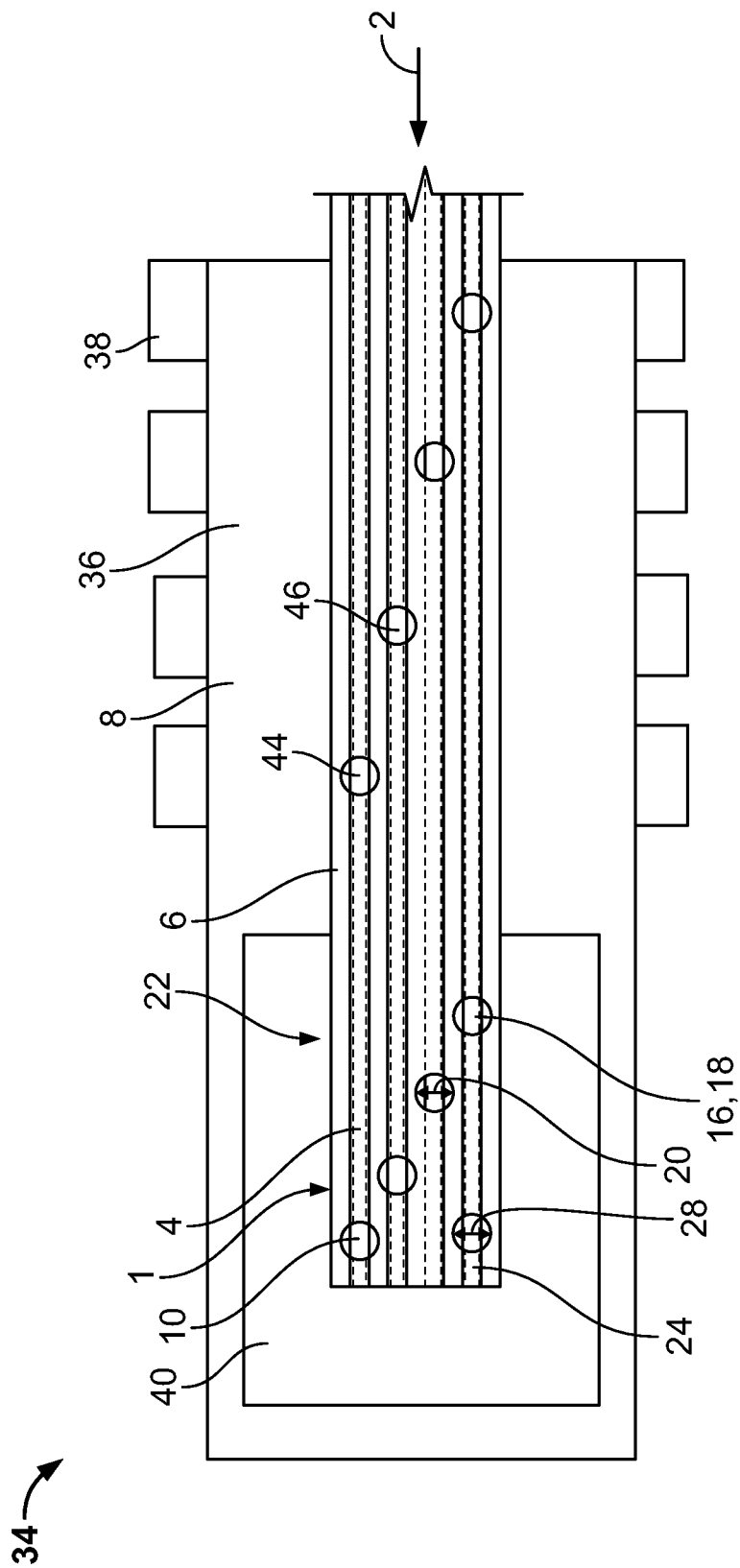
FIG. 2 is a plan view of a cable connection according to an embodiment.

As shown in FIGS. 1 and 2, the cable 1 is a flat cable 22, in which several cable cores 4 are arranged parallel alongside one another on a level plane. The flat cable 22 is a flexible flat cable (FFC), in which the cable cores 4 are configured as metal strips 24 with a thickness 26 and a width 28. In an embodiment, the width 28 of the cable core 4 is smaller than approximately 1 mm.

The flat cable 22 can extend over the electrical conductor 8 and each cable core 4 can be connected to the electrical conductor 8. For this purpose, each cable core 4 is exposed at at least one dedicated contact zone 10. In an embodiment, the contact zones 10 are arranged offset from one another in cable direction 2. As a result of this, the flat cable 22 can be connected to the electrical conductor 8, or also to different electrical conductors, at different positions along the cable direction 2.

As shown in FIG. 1, the contact zone 10 above and below the cable core 4 is filled perpendicular to the cable direction 2, until its surface 12 is arranged substantially flush with the cable surface 14 on an underside 30 and an upper side 32 which is situated opposite the underside 30. The cable core 4 can thus be protectively encased by the filling 18. A force can be exerted on the cable 1 at the upper side 32, in order to hold the contact zone 10 down during the joining process, without additionally stressing or deforming the cable core 4. Since a deformation of the cable core 4 is avoided, the thickness 26 of the cable core 4 can be minimized to approximately 0.075 mm. A cable core 4 with such a thickness 26 could tear in the event of a typical deformation, for example, as a result of pressing down with a sonotrode.

By way of the contact zone 10 which is filled on both sides substantially flush with the cable surface 14, the user is given greater freedom when designing his cable connection. The cable 1 can thus be arranged at a contact zone 10 below an electrical conductor 8, or above.

A cable connection 34 according to an embodiment is shown in FIG. 2. The cable 1 is a flexible flat cable 22 which is laid onto the electrical conductor 8 and which extends over the electrical conductor 8 in the cable direction 2. The electrical conductor 8 is, for example, a cell connector 36 which connects together individual battery cells 38 which are arranged in rows.

In the embodiment shown in FIG. 2, each cable core 4 has at least two contact zones 10 spaced apart from one another in the cable direction 2. The cable core 4 can be connected to the electrical conductor 8 in one contact zone 10 and to a further conductor, for example a circuit board 40, in the other contact zone 10. The cable cores 4 which lie alongside one another have contact zones 10 which are offset from one another, so that in each case a cable core 4, at the height of a battery cell 38, can be connected to the electrical conductor 8. In an embodiment, the contact zones 10 are arranged offset from one another in the cable direction 2 for connection to the circuit board 40. As a result, it is possible to prevent unintentional bridging between the cable cores 4 when soldering or welding.

The contact zones 10 can be configured such that they are suitable to receive a solder ball. For example, the circuit board 40 can be supplied with solder balls which can be placed onto the contact zone 10 in order to produce a simple and efficient solder connection between the circuit board 40 and the contact zone 10. For this purpose, a width 20 of the contact zone 10 can be greater than the width of the solder ball. Furthermore, it is advantageous if the filling 18 is stable and does not become deformed through the pressing-on of the solder ball.

In a plan view, the contact zone 10 has a substantially circular cross-section 44, as shown in FIG. 2. The filled contact zone 10 thus substantially describes a cylinder 46. In particular, a central axis of the cable core 4 can be arranged substantially perpendicular to the cylinder axis and can intersect it. As a result, it can be guaranteed that the cable core 4 is exposed symmetrically in the contact zone 10 and a uniform connection to the electrical conductor 8 can be produced. The width 20 of the contact zone 10, as shown in FIG. 2, can be greater than the width 28 of the cable core 4. As a result of this, the cable core 4 can be protectively surrounded by the filling 18 in the contact zone 10. Alternatively, the width 20 of the contact zone 10 can also be smaller than the width 28 of the cable core 4. As a result, the contact zone 10 is further minimized, which makes it possible to further miniaturize the cable 1 and the cable connection 34.

By virtue of the cable 1, with at least one contact zone 10 filled up to the cable surface 14, the space required to hold down the cable 1 can be significantly reduced. The contact zone 10 can be pushed against the electrical conductor 8 and can be connected to the electrical conductor 8 preferably by laser welding. As a result, a significantly smaller welding point is obtained compared to ultrasonic welding, in which case a sonotrode has to be placed onto the welding point.

What is claimed is:

1. A cable, comprising:
  a cable core formed of an electrically conductive material; and
  an insulation at least partially encasing the cable core, an underside and an upper side of the cable core is exposed in a contact zone in which the cable contacts an electrical conductor, the contact zone is filled above and below the cable core with an electrically conductive contact material applied over the underside and the upper side of the cable core until a surface of the contact zone is substantially flush with a cable surface of the insulation on both the underside and the upper side of the cable core, a width of the contact zone on the underside and the upper side being greater than a width of the cable core such that the cable core is surrounded by the electrically conductive material in the contact zone.

2. The cable of claim 1, wherein the cable core is formed from substantially a same material as the electrically conductive contact material.

3. The cable of claim 1, wherein the contact zone is galvanically filled up to the surface of the contact zone substantially flush with the cable surface.

4. The cable of claim 1, wherein the contact zone has a width of a maximum of 0.8 mm.

5. The cable of claim 1, wherein the cable is a flat cable having a pair of cable cores arranged alongside one another.

6. The cable of claim 5, wherein each of the cable cores is exposed in a contact zone in which the cable core contacts an electrical conductor.

7. The cable of claim 6, wherein the contact zones of the cable cores are separated from one another.

8. The cable of claim 6, wherein the contact zones of the cable cores are arranged offset from one another.

9. The cable of claim 1, wherein the cable core is exposed in a plurality of contact zones.

10. The cable of claim 1, wherein the contact zone has a substantially circular cross section.

11. The cable of claim 1, wherein the electrically conductive material does not extend beyond the cable surface of the insulation on the underside and the upper side of the cable core.

12. The cable of claim 1, wherein the contact zone is defined by a recess formed through the insulation having a height defined between the cable surface of the insulation on both the underside and the upper side of the cable core, the width of the contact zone extending in a direction normal to the height, the cable core extending through the contact zone such that the electrically conductive material fills the contact zone between the cable surface of the insulation on both the underside and the upper side of the cable core for surrounding lateral edges of the cable core.

13. A method for manufacturing a cable, comprising:
  providing the cable having a cable core formed of an electrically conductive material and an insulation at least partially encasing the cable core, the cable core is exposed in a recessed contact zone in which the cable contacts an electrical conductor, the an underside and an upper side of the cable exposed in the contact zone, with a width of the a width of the contact zone on the underside and the upper side being greater than a width of the cable core; and filling the contact zone above and below the cable core with an electrically conductive contact material applied over the underside and the upper side of the cable core until a surface of the contact zone has a height equal to a cable surface of the insulation on both an underside and an upper side of the cable core and the cable core is surrounded in the contact zone with the conductive material.

14. The method of claim 13, wherein the contact zone is filled galvanically.

15. A cable connection, comprising:
an electrical conductor; and
a cable including a cable core formed of an electrically conductive material and an insulation at least partially encasing the cable core, an underside and an upper side of the cable core are exposed in a recessed contact zone in which the cable has a laser weld connection with the electrical conductor, a surface of the contact zone is filled flush with a cable surface of the insulation with an electrically conductive contact material above and below the cable core until the surface of the contact zone is substantially flush with the cable surface of the insulation on both the underside and the upper side of the cable core, a width of the contact zone being greater than a width of the cable core such that the cable core is surrounded by the electrically conductive contact material.

* * * * *